June 14, 1960 J. C. GRAVENO Re. 24,839

CONTAINER

Original Filed Jan. 14, 1950 2 Sheets-Sheet 1

INVENTOR
JOHN C. GRAVENO
BY
Gustav A. Wolff.
ATT.

CONTAINER

Original Filed Jan. 14, 1950 2 Sheets-Sheet 2

INVENTOR.
JOHN C. GRAVENO
BY
Gustav A. Wolff
ATT.

United States Patent Office

Re. 24,839

Reissued June 14, 1960

24,839

CONTAINER

John C. Graveno, South Euclid, Ohio, assignor of one-half to Joseph E. Stern, East Cleveland, Ohio Original No. 2,634,896, dated Apr. 14, 1953, Ser. No. 138,649, Jan. 14, 1950. Application for reissue July 8, 1959, Ser. No. 825,855

3 Claims. (Cl. 229—17)

Matter enclosed in heavy brackets [ ] appears in the original patent but forms no part of this reissue specification; matter printed in italics indicates the additions made by reissue.

This invention relates in general to containers suitable for packaging and dispensing milk and other liquids, and, more particularly to sealed containers of the type provided with collapsible, hidden spouts arranged to be exposed by opening of such containers.

The primary object of the invention is the provision of a container of the type referred to above, shaped from a single blank of inexpensive, foldable, moisture-proof material, the container including integrally formed therewith a collapsible, spout-like closing and discharge portion which in collapsed condition forms a sealing element and in opened up condition provides a discharge element.

Another object of the invention is the provision of a container shaped from a single blank of inexpensive, foldable, moisture-proof material, the container being closed at its top by a staple member, and including integrally formed therewith a collapsible, spout-like closing and discharge portion having its tip end folded inwardly, the closing and discharge portion in collapsed condition forming a sealing element readily and easily exposed, and shaped to a discharge spout by tearing part of the top of the container on predetermined tearing lines without the necessity of removing the staple from such top.

The above and other objects of novelty of the invention will be either specifically pointed out or will become apparent when referring, for a better understanding of my invention, to the following description taken in conjunction with the accompanying drawings, wherein.

Figure 5:
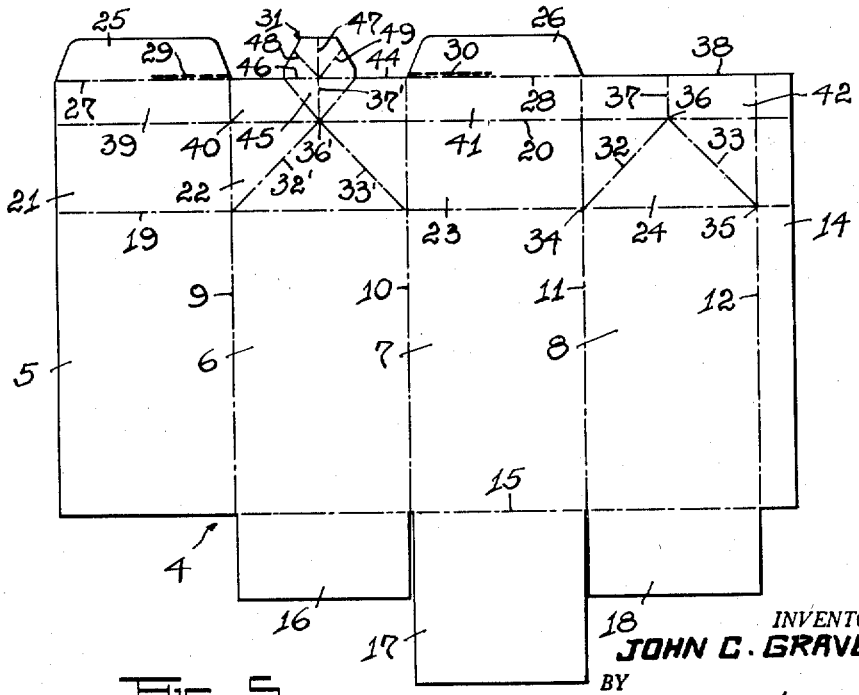
Fig. 5 is a plan view of the cut and scored blank prior to its folding into a container.

Referring now more specifically to the structure of the invention disclosed in the drawings, reference numeral 2 denotes a container formed with a slanting top or closing end 3. This container is folded from a pre-shaped, scored blank 4, (see Fig. 5) of suitable foldable, moisture-proof material, which blank is composed of four panels 5, 6, 7 and 8 separated by vertical scored lines 9, 10 and 11 defining folding lines and facilitating creasing of the blank. Adjoining to panel 8 and separated therefrom by a score line 12 is a sealing flap 14 which is to receive an adhesive for attaching it to the inner face of the adjacent free edge of panel 5 when the container is folded to shape. The lower ends of the panels are defined by a horizontal score line 15 forming a hinge line for the bottom flaps 16, 17 and 18 of the container which flaps form its bottom end and by overlaying provide a bottom of double thickness insuring a strong and rugged structure. The upper horizontal score line 19 also forms a hinge line and separates the side panels 5, 6, 7 and 8 from top sealing flaps 21, 22, 23 and 24 which are horizontally scored by score line 20 for a purpose later to be described. Sealing flaps 21 and 23 are identical in construction, each including a secondary sealing flap section 25, 26 respectively, formed by scoring the flaps on lines 27, 28 respectively, which score lines are partly perforated as indicated at 29 and 30. The sealing flaps 22 and 24 are of identical construction with the exception that sealing flap 22 additionally includes an extension 31 to be used for a purpose later to be described.

Sealing flap 24 is scored on diagonal lines 32, 33 which run symmetrically at an inclination from the lower corners 34, 35 of the flap to a point 36 on score line 20 and thence into a single vertical line 37 ending at the upper edge 38 of such flap. In closed, sealed condition of the container, top sealing flaps 22 and 24 extended upwardly from side panels 6 and 8 are tucked under the top sealing flaps 21 and 23. This is effected by folding the flaps 22 and 24 on score lines 32, 33 and 37 and 32', 33' and 37' until adjoining portions of the score line 20 contact each other, folding of one of the two secondary sealing flap sections 25, 26 over the top edges of the vertically extended portions 39, 40, 41 and 42 of the respective top sealing flaps and the other one of said secondary sealing flap sections, and rigidly connecting the sealing flap sections in their closed position by a staple 43 which is extended through secondary sealing flap sections 25, 26 and the vertically extended portions 39, 41 and 42.

Sealing flap section 40 is not penetrated by staple 43 so as to permit pulling out of the flap section 22 to act as a dispensing spout. For such purpose sealing flap 22 has the score lines 32', 33' and 37'—which are the equivalent of score lines 32, 33 and 37 on sealing flap section 24—extended on straight lines beyond their meeting point 36' to the top edge 44 of flap 22 and has portion 45 arranged between the extended score lines 32' and 33' folded outwardly to prevent gripping of said portion 45.

Figure 2:
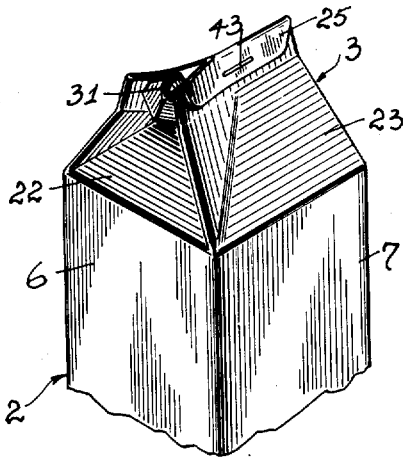
Fig. 2 is a fragmentary perspective view of the container shown in Fig. 1, the container being partly torn at its top edge, showing the collapsible, spout-like closing and discharge portion exposed and partly opened up.
Figure 1:
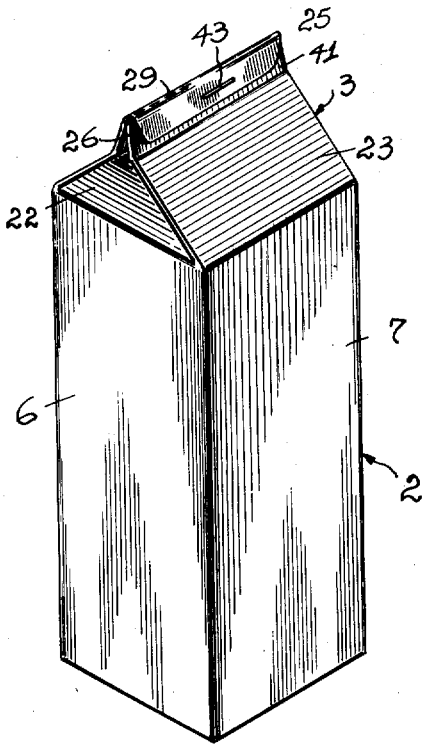
Fig. 1 is a perspective view of completely sealed container constructed in accordance with the invention.
Figure 3:
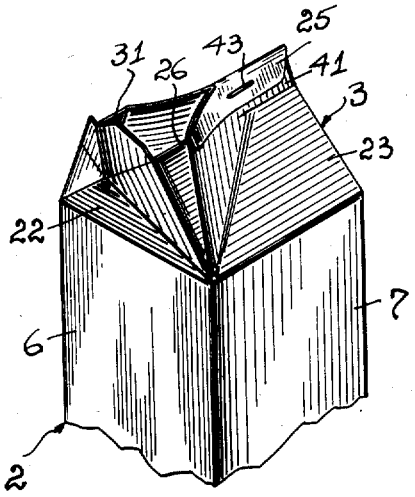
Fig. 3 is a fragmentary perspective view similar to Fig. 2 showing the collapsible, spout-like closing and discharge portion fully exposed and opened up.

Containers of the type described have a fluid-tightly sealed top portion including a collapsible, spout-like closing and discharge flap portion 22 which for dispensing purposes can readily be pulled out and openly exposed without removing staple 43 after secondary sealing flap sections 25 and 26 are partly torn from sealing flap sections 21 and 23 on perforated lines 29 and 30, to permit such pulling out of the collapsible, spout-like closing and discharge flap portion 22, all as clearly indicated in Figs. 2 and 3.

However, outward folding of the portion 45 of top sealing flap 22 effects lowering of the top edge of this portion and such lowering of the top edge of portion 45 may cause leakage of the sealed container in this area of such portion. Such a danger of leakage at this point is overcome by providing flap 22 with the extension 31 previously referred to. This extension which is an integral part of flap 22 and extends from the middle portion of its top edge 44, forms a collapsible secondary spout section on the portion 45 of flap 22. For such purpose extension 31 is separated from portion 45 by a score line 46. Furthermore, score line 37' continues through extension 31 as score line 47, and finally extension 31 is additionally scored by two inclined score lines 48 and 49 which extend from the intersecting point of score line 37′ and score line 46 in substantially parallel relation to score lines 32′ and 33′.

Figure 4:
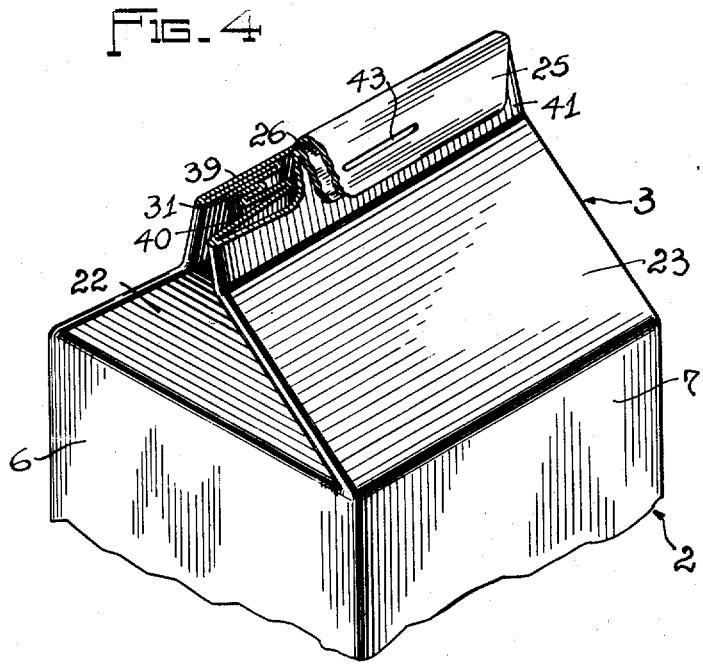
Fig. 4 is a fragmentary perspective view of the completely sealed container with parts broken away to disclose the sealing and closing portion of the collapsed, spout-like closing and discharge portion of the container.

Extension 31 which in the sealed container is folded inwardly (see Fig. 4) and fluid-tightly seals the above referred to possible point of leakage of the container also simplifies pulling out of the collapsible discharge spout when secondary sealing flap sections 25 and 26 are partly torn from the container in the manner previously described.

Containers of the type described can readily and easily be sufficiently opened for discharge of their contents without removal of the staples holding the container in sealed condition by partly tearing secondary sealing flap sections 25 and 26 from top sealing flaps 21 and 23 on perforated lines 29 and 30, outward spreading of these top sealing flaps to a position such as shown in Fig. 2 and outward pulling of sealing flap 22 to discharge position (see Fig. 3) in which latter position these sealing flaps 22 form spout-like discharge elements for the containers. Containers of this type also permit reclosing so as to properly protect any residue of their contents when the sealing flaps are pushed inwardly to their original sealing positions.

Having thus described my invention what I claim is:

1. A liquid container of foldable, moisture-proof material comprising four side-walls scored at their upper ends to provide a closure embodying a pair of outer sealing members and a pair of inner sealing members arranged between said outer sealing members and cooperating therewith, said inner sealing members each being inwardly folded on symmetrically arranged inclined fold lines intersecting each other and a horizontally arranged fold line extended through the point of intersection of said inclined fold lines to form each inner sealing member with a single, inwardly and upwardly extended, triangularly shaped portion, *engaging means for holding the outer and the inwardly folded inner sealing members together in closed relation at their upper ends and means coacting therewith to isolate one of said inwardly folded inner sealing members from engagement by said engaging means, said non-engaged* one of the inner sealing members having its inclined fold lines extended beyond the point of intersection to the top edge of such sealing member and the area of such sealing member between the extended portions of the inclined fold lines *adapted to be* folded outwardly to form said inner sealing member with an outwardly extended collapsible spout-like discharge element extended above the triangularly shaped side portion of said inner sealing member.

2. A liquid container as described in claim 1, wherein the said one inner sealing member includes at its top edge an extension opposite the area enclosed by the extended portions of said inclined fold lines, wherein said extension is formed with fold lines arranged parallel to the said inclined fold lines, and wherein said extension is folded on its fold lines to decrease the size of the top opening of the collapsed spout-like discharge element and facilitates sealing of such discharge element when in collapsed position.

*3. A liquid container of foldable, moisture-proof material comprising four side-walls scored at their upper ends along four first horizontal fold lines all at a common level to provide a closure above said first horizontal fold lines embodying a pair of outer sealing members and a pair of inner sealing members arranged between said outer sealing members and cooperating therewith, each of said inner and outer sealing members having a second horizontal fold line extending across its upper portion to define an integral secondary sealing member associated with each of said sealing members above said second horizontal fold line, said second horizontal fold lines being on a common level, said inner sealing members each being inwardly folded below its associated second horizontal fold line on symmetrically arranged inclined fold lines intersecting each other, the associated second horizontally arranged fold lines being extended through the point of intersection of the corresponding inclined fold lines to form each inner sealing member with a single inwardly and upwardly extending, triangularly-shaped portion below said associated second horizontal fold lines respectively, said secondary sealing members being disposed in folded juxtaposed relationship with a secondary sealing member associated with one of said outer sealing members being disposed outermost and being folded in surrounding relationship around the remaining secondary sealing members, engaging means for holding the secondary sealing members of said pair of outer sealing members and of said inwardly folded inner sealing members together to maintain the juxatposed relationship and means coacting therewith to isolate one of said inwardly folded inner sealing members from engagement by said engaging means, other means for facilitating the separation from said juxtaposed relationship of said secondary sealing member portions associated with said outer sealing members adjacent the non-engaged inner sealing member to permit its ready release from its inwardly folded position, said non-engaged one of the inner sealing members having its inclined fold lines extended beyond the point of intersection to the top edge of such sealing member and the portion of such sealing member at the extended portions of the inclined fold lines adapted to be folded outwardly to form said non-engaged inner sealing member with an outwardly extended collapsible spout-like discharge element extended above the triangularly shaped side portion of said non-engaged inner sealing member.*

References Cited in the file of this patent or the original patent

UNITED STATES PATENTS

| | | |
|---|---|---|
| 2,158,097 | Wentz | May 16, 1939 |
| 2,321,139 | Gruger | June 8, 1943 |
| 2,336,503 | Ringler | Dec. 14, 1943 |
| 2,337,730 | Berch | Dec. 28, 1943 |